Nov. 5, 1935.  I. L. EASTMAN  2,019,955
GREASE GUN HEAD AND NOZZLE CONSTRUCTION
Filed April 16, 1934   2 Sheets-Sheet 1
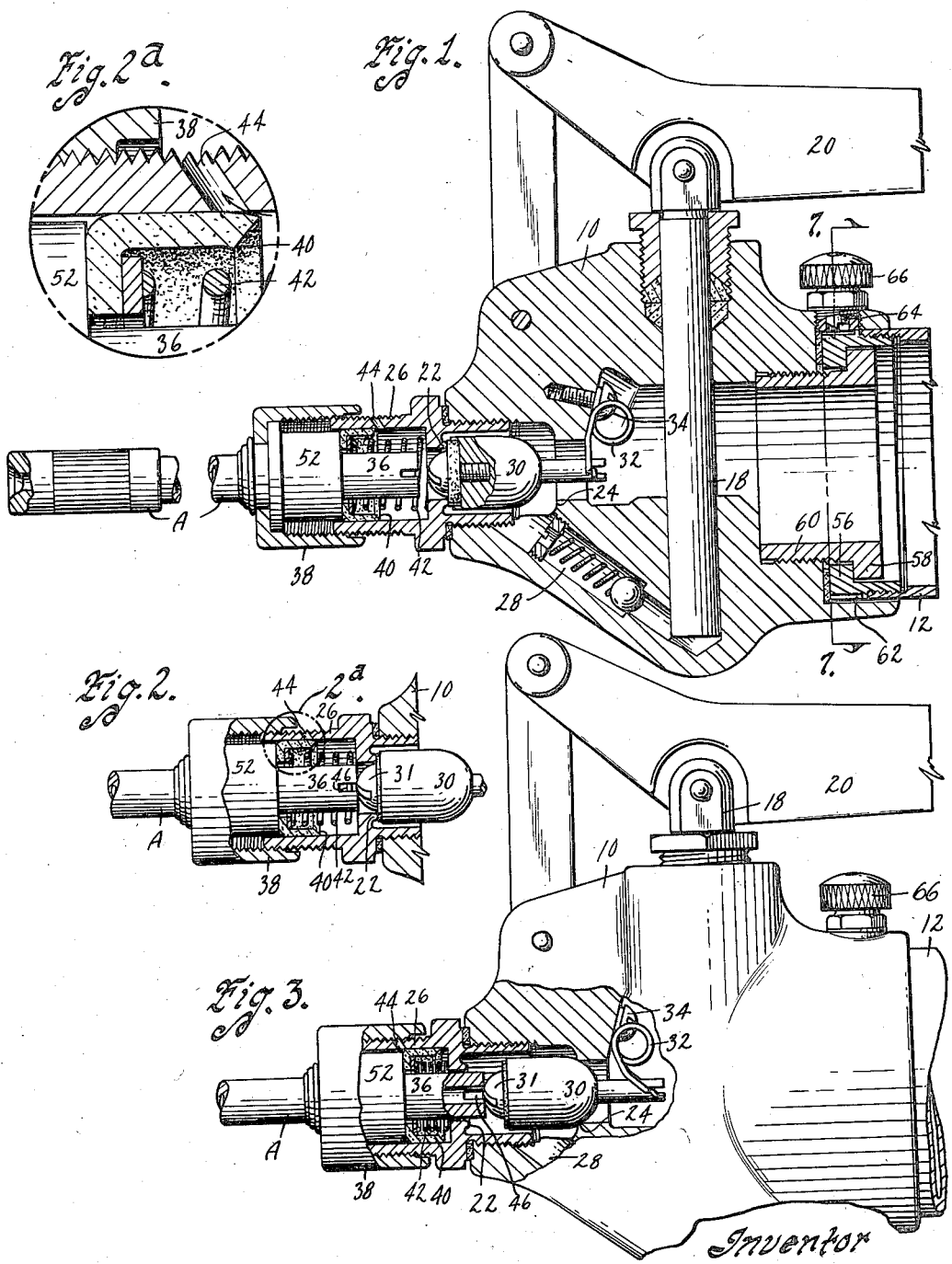

Nov. 5, 1935.  I. L. EASTMAN  2,019,955
GREASE GUN HEAD AND NOZZLE CONSTRUCTION
Filed April 16, 1934   2 Sheets-Sheet 2
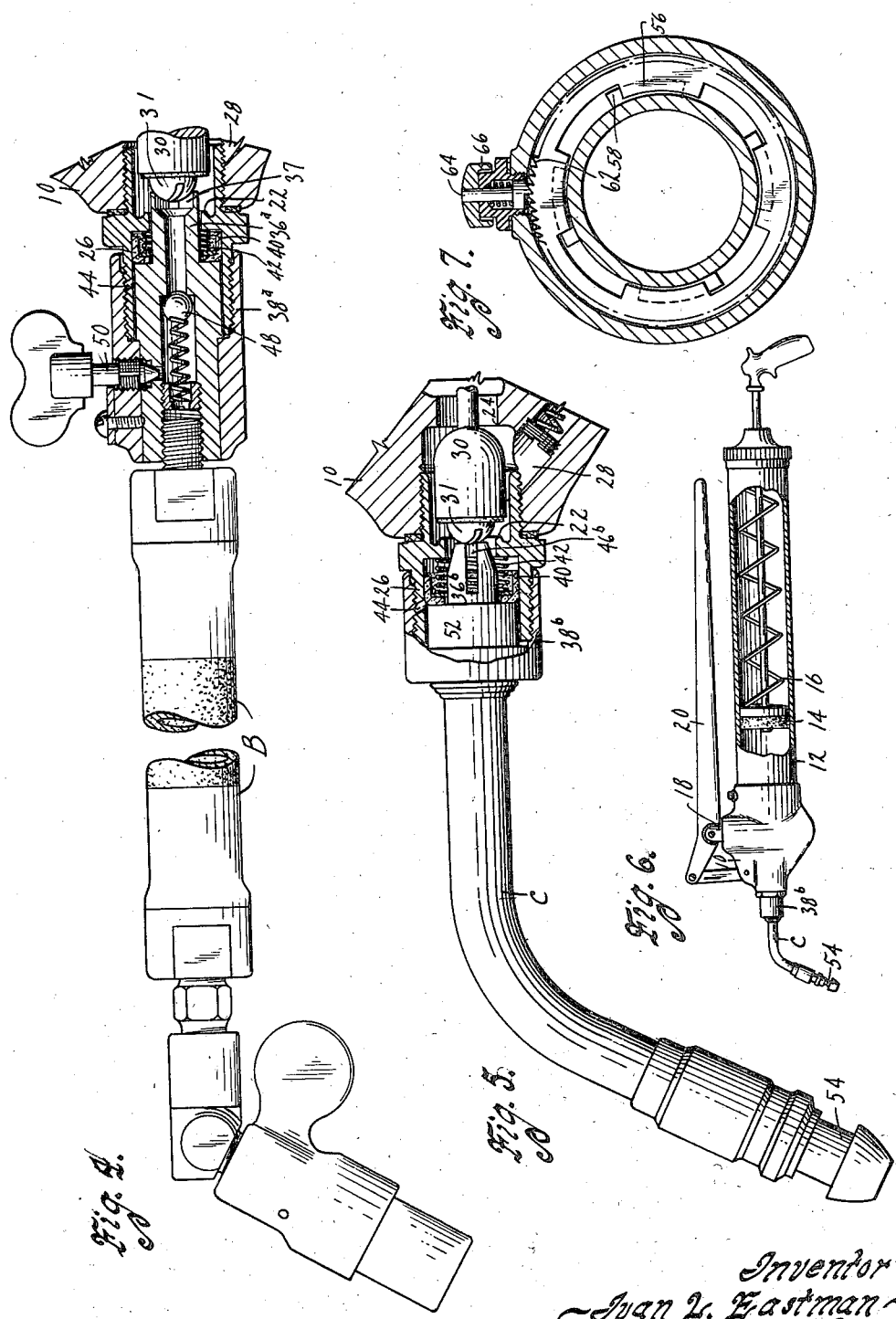
Inventor
Ivan L. Eastman
By Bair, Freeman & Sinclair
Attorneys
Witness
H. S. Munzenmaier Patented Nov. 5, 1935

2,019,955

UNITED STATES PATENT OFFICE 2,019,955

GREASE GUN HEAD AND NOZZLE CONSTRUCTION

Ivan L. Eastman, Toledo, Ohio, assignor to The Aro Equipment Corporation, Bryan, Ohio, a corporation of Ohio Application April 16, 1934, Serial No. 720,777

17 Claims. (Cl. 221—47.4)

The object of my invention is to provide a grease gun head and nozzle construction which is simple, durable and comparatively inexpensive to manufacture.

A further object is to provide a grease gun head having a booster pump therein and a shut off valve arrangement operable to shut off the flow of grease from said head when there are no nozzles associated with it, interchangeable nozzles being provided and arranged to open the shut off valve and either position it so that direct delivery of grease can be made from the reservoir wherein the grease is under low pressure, or the booster pump mechanism becomes operable to deliver the grease to the nozzle at high pressure.

More particularly it is my object to provide a grease gun head having a nozzle valve seat and a reservoir valve seat with a valve plug normally seated against the nozzle valve seat, said plug being movable to position spaced therefrom by the nozzle when associated with the grease gun head, one type of nozzle being operable to position the valve plug between the two seats and another one being operable to seat it against the reservoir valve seat.

Still another object is to provide novel features in the connection of the nozzle to the head to prevent leakage of grease at this point during the connecting operation after the valve plug is unseated from the nozzle valve seat.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a vertical sectional view through a grease gun head and nozzle construction embodying my invention, showing the nozzle at the beginning of its connecting operation with the grease gun head.

Figure 2 is a similar view of a portion of Figure 1 showing the parts further telescoped together.

Figure 2a is an enlarged view of the portion of Figure 2 within the circle 2a, showing the operation in greater detail.

Figure 3 is a sectional view similar to Figure 1 showing the parts in fully connected position.

Figure 4 is a sectional view showing a whip end hose type of nozzle fully connected with the grease gun head.

Figure 5 is a similar sectional view showing a direct delivery type of nozzle connected with the grease gun head.

Figure 6 is a side elevation, partly in section, of the complete grease gun; and Figure 7 is a sectional view on the line 7—7 of Figure 1 illustrating a ratchet mechanism to prevent accidental disconnection of the grease gun reservoir from the grease gun head.

On the accompanying drawings I have used the reference numeral 10 to indicate the grease gun head. A reservoir 12 which is used therewith has in it a piston 14 normally placing the grease under low pressure by either a spring 16 or compressed air or the like.

Within the head 10 a booster pump is provided having a plunger 18 operable by a lever 20. A nozzle valve seat 22 and a reservoir valve seat 24 are provided in the head 10 between the reservoir 12 and a nozzle fitting 26. A passageway 28 extends from the booster pump plunger 18 to the space in the head 10 between the valve seats 22 and 24.

Between the valve seats, a valve plug 30 is provided normally seated against the nozzle valve seat 22 by a spring 32. The spring 32 is anchored to the head 10 by a screw 34.

In Figure 1 I show a contact type of nozzle A having an extension 36 and a clamping nut 38. The nut 38 is adapted to be screwed on to the threaded exterior of the nozzle fitting 26, this fitting being cylindrical and having therein a cup leather or other sealing means 40. A spring 42 normally tends to keep the cup leather 40 in the approximate position of Figure 1. A leak hole 44 is provided in the wall of the cylindrical fitting 26.

In Figure 4 I illustrate a whip end hose type of nozzle B. It likewise has an extension indicated at 36a. The extension 36 in Figure 1 is provided with a slot 46 to permit the flow of grease from the cylindrical fitting 26 into the extension which is hollow. The extension 36a is also hollow, as shown in Figure 4 and terminates in an angular socket 37 which permits grease to flow past a screw head 31 of the valve plug 30 when the screw head 31 enters the socket as shown in Figure 4. The whip end hose B includes a check valve 48 and a pressure relief valve 50.

In Figure 5 I illustrate a direct delivery type of nozzle C having an extension 36b provided with a slot 46b. Each of the nozzles A, B and C has a plunger-like head 52 adapted to enter the cylindrical fitting 26 and engage the cup leather 40.

The direct delivery nozzle C is preferably provided with a non-drip shut-off nose 54 such as illustrated in my co-pending application, Serial No. 631,949 filed September 6th, 1932, so that grease delivery is effected only when this nose is pushed inwardly relative to the nozzle C.

The reservoir 12 is provided with locking lugs 56 adapted to coact with locking lugs 58 extending from a sleeve 60 of the head 10 in the manner described in my Patent No. 1,899,798, issued February 28, 1933.

To prevent accidental disconnection of the lugs from each other, I provide ratchet teeth 62 formed on the reservoir 12 and a pawl 64 engaging the teeth. The pawl is spring pressed to engage the teeth but may be disassociated therefrom by lifting and twisting or merely twisting the knurled head 66 on the pawl. The locking position of the pawl is shown in Figure 7 while in Figure 1 it has been twisted to a position which permits disconnecting rotation of the reservoir 12 relative to the head 10.

*Practical operation*

In the operation of my present invention, the nozzle A may be used with the head 10, three successive positions being shown in Figures 1, 2, and 3.

In Figure 1 the nut 38 has just started on the fitting 26. The leak hole 44 is open so that the tendency is to compress air within the cylinder-like fitting 26, and this is counteracted by the air leaking to atmosphere. When the extension 36 engages the screw head 31 the cup leather 40 has just covered the leak hole 44, although some of the air can leak out, as indicated by the arrow in Figure 2a. Further turning of the nut 38 on to the fitting 26 spaces the valve 30 from the valve seat 22 so that there is no longer any necessity for the leak hole. It then becomes covered by the cup leather and shut off from the interior of the fitting 26 as shown in Figure 3 wherein the nozzle is in its finally assembled position and the extension 36 has caused the valve plug 30 to seat against the reservoir valve seat 24.

The gun is now ready for a booster operation by reciprocating the plunger 18.

Likewise with the nozzle B, shown in Figure 4, the valve 30 seats against the seat 24 and the gun is ready for a booster operation.

With the form of nozzle shown in Figure 5, however, direct delivery of the grease is desired, that is, the booster pump is not operated and the low pressure on the grease forces it directly past the valve seats 24 and 22 into the nozzle C. When the valve in the nose is opened by placing the part 54 against a fitting, the low pressure grease flows out of the nose and into the fitting.

By making the extension 36 of the proper length the valve 30 can be seated against the seat 24 or be maintained in an intermediate position as shown in Figure 5 if desired. Thus the proper nozzle for direct delivery automatically adjusts the valve for direct delivery of grease past the booster plunger 18 while the proper nozzle requiring booster operation closes the valve 30 against the seat 24.

As any of the nozzles is connected with the grease gun head it automatically allows escape of air tending to be compressed in the fitting 26 by the particular sealing construction between the head 52 of the nozzle fitting 26. Also this seal prevents any escape of grease under pressure during the connecting operation.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a grease gun head and nozzle construction for use with a grease reservoir having grease under pressure therein, a grease gun head and a direct delivery nozzle coactible therewith, a delivery bore in said head, an inlet valve seat and an outlet valve seat in said bore, said valve seats being spaced from and facing each other, a valve plug in said bore of less diameter than the bore and of less length than the distance between said seats, means normally constraining said valve plug to engage the outer seat only, said direct delivery nozzle having an extension of less diameter than said bore and engaging said valve plug when the nozzle is associated with said head, said extension being of predetermined length to space said valve plug from the outer seat and position it between the seats whereby grease under pressure from said reservoir can flow direct to said nozzle through said bore past both seats and the valve plug.

2. In a grease gun head and nozzle construction for use with a grease reservoir having grease under pressure therein, a grease gun head and a direct delivery nozzle coactible therewith, a delivery bore in said head, an inlet valve seat and an outlet valve seat in said bore, said valve seats being spaced from and facing each other, a valve plug in said bore of less diameter than the bore and of less length than the distance between said seats, means normally constraining said valve plug to engage the outer seat only, said direct delivery nozzle having an extension of less diameter than said bore and engaging said valve plug when the nozzle is associated with said head, said extension being of predetermined length to space said valve plug from the outer seat and position it between the seats whereby grease under pressure from said reservoir can flow direct to said nozzle through said bore past both seats and the valve plug, and means to prevent leakage of grease from the coacting parts of said head and nozzle while connecting the two together.

3. In a grease gun head and nozzle construction for use with a grease reservoir having grease under pressure therein, a grease gun head and a direct delivery nozzle coactible therewith, a delivery bore in said head, an inlet valve seat and an outlet valve seat in said bore, said valve seats being spaced from and facing each other, a booster between said reservoir and the space between said valve seats, a valve plug in said bore of less diameter than the bore and of less length than the distance between said seats, means normally constraining said valve plug to engage the outer seat only, said direct delivery nozzle having an extension of less diameter than said bore and engaging said valve plug when the nozzle is associated with said head, said extension being of predetermined length to space said valve plug from the outer seat and position it between the seats whereby grease under pressure from said reservoir can flow direct to said nozzle through said bore past both seats and the valve plug and a second nozzle coactible with said grease gun head when said booster is to be used, said second nozzle having an extension of less diameter than said bore and engageable with said valve plug when said second nozzle is associated with said head, said last mentioned extension being of predetermined length to space said valve plug from the outer valve seat and position it in engagement with the inner one whereby grease under pressure from said reservoir is retained against direct flow past said inner valve seat and said booster is operable to pump grease from said reservoir through the outer valve seat and the second nozzle.

4. In a device of the class described, a grease gun head and a nozzle for coaction therewith, said head having a pair of valve seats facing each other, a valve plug located between said seats, a low pressure grease supply communicating with one of said valve seats and a booster pump communicating with said head between said valve seats, said valve plug being normally seated against one of said valve seats and seatable against the other one and the nozzle having an extension to engage said valve plug and unseat it from the seat it normally engages when said nozzle coacts with said head, the coacting parts of the nozzle and head comprising a cylinder, a cup leather therein and a plunger to engage said cup leather, said cylinder having a leak hole to relieve compressed air from within said cylinder after coaction takes place.

5. In a device of the class described, a grease gun head and a nozzle for coaction therewith, said head having a pair of valve seats facing each other, a valve plug located between said seats, a low pressure grease supply communicating with one of said valve seats and a booster pump communicating with said head between said valve seats, said valve plug being normally seated against one of said valve seats and seatable against the other one and the nozzle having an extension to engage said valve plug and unseat it from the seat it normally engages when said nozzle coacts with said head, the coacting parts of the nozzle and head comprising a cylinder, a cup leather therein and a plunger to engage said cup leather, said cylinder having a leak hole to relieve compressed air from within said cylinder after coaction takes place, said leak hole being covered by said cup leather after said extension engages said valve plug.

6. In a device of the class described, a grease gun head and a nozzle for coaction therewith, said head having a pair of valve seats facing each other, a valve plug located between said seats, a low pressure grease supply communicating with one of said valve seats and a booster pump communicating with said head between said valve seats, said valve plug being normally seated against one of said valve seats and seatable against the other one and the nozzle having an extension to engage said valve plug and unseat it from the seat it normally engages when said nozzle coacts with said head, the coacting parts of the nozzle and head comprising a cylinder, a packing therein and a plunger to engage said packing, said cylinder having a leak hole to relieve compressed air from within said cylinder after coaction takes place.

7. In a device of the class described, a grease gun head and a nozzle for coaction therewith, said head having a pair of valve seats facing each other, a valve plug located between said seats, a low pressure grease supply communicating with one of said valve seats and a booster pump communicating with said head between said valve seats, said valve plug being normally seated against one of said valve seats and seatable against the other one and the nozzle having an extension to engage said valve plug and unseat it from the seat it normally engages when said nozzle coacts with said head, the coacting parts of the nozzle and head comprising a cylinder, a packing therein and a plunger to enage said packing, said cylinder having a leak hole to relieve compressed air from within said cylinder after coaction takes place, said leak hole being covered by said packing after said extension engages said valve plug.

8. In a device of the class described, a grease gun head and a nozzle for coaction therewith, said head having a pair of valve seats facing each other, a valve plug located between said seats, a low pressure grese supply communicating with one of said valve seats and a booster pump communicating with said head between said valve seats, said valve plug being normally seated against one of said valve seats and seatable against the other one and the nozzle having an extension to engage said valve plug and unseat it from the seat it normally engages when said nozzle coacts with said head, the coacting parts of the nozzle and head comprising a cylinder, a cup leather therein and a plunger to engage said cup leather, said cylinder having a leak hole to relieve compressed air from within said cylinder after coaction takes place, said head and said nozzle having coacting screw threads for connecting the two together.

9. In a device of the class described, a grease gun head and a nozzle for coaction therewith, said head having a pair of valve seats facing each other, a valve plug located between said seats, a low pressure grease supply communicating with one of said valve seats and a booster pump communicating with said head between said valve seats, said valve plug being normally seated against one of said valve seats and seatable against the other one and the nozzle having an extension to engage said valve plug and unseat it from the seat it normally engages when said nozzle coacts with said head, the coacting parts of the nozzle and head comprising a cylinder, a packing therein and a plunger to engage said packing, said cylinder having a leak hole to relieve compressed air from within said cylinder after coaction takes place, said head and said nozzle having coacting screw threads for connecting the two together.

10. In a device of the class described, a grease gun head and a nozzle for coaction therewith, said head having a valve seat, a valve plug normally seated therein, a low pressure grease supply communicating with said valve seat, a nozzle having an extension to engage said valve plug and unseat it when said nozzle coacts with said head, the coacting parts of said head and said nozzle comprising a cylinder, a cup leather therein and a plunger to engage said cup leather, said cylinder having a leak hole to relieve compressed air from within said cylinder as coaction takes place.

11. In a device of the class described, a grease gun head and a nozzle for coaction therewith, said head having a valve seat, a valve plug normally seated therein, a low pressure grease supply communicating with said valve seat, a nozzle having an extension to engage said valve plug and unseat it when said nozzle coacts with said head, the coacting parts of said head and said nozzle comprising a cylinder, a cup leather therein and a plunger to engage said cup leather, said cylinder having a leak hole to relieve compressed air from within said cylinder as coaction takes place, said head and said nozzle having coacting screw threads for connecting the two together.

12. In a device of the class described a grease gun head, a valve seat therein, a valve plug normally seated against said seat, a nozzle, an extension on said nozzle for spacing said valve plug from said valve seat when said nozzle coacts with said head, the coacting parts of the nozzle and head comprising a cylinder, packing therein and a leak hole through the wall of said cylinder, said packing being movable into said cylinder as the nozzle coacts with said head and covering said leak hole after the nozzle spaces said valve plug from said seat.

13. In a device of the class described, a grease gun head, a valve seat therein, a valve plug normally seated against said seat, a nozzle, an extension on said nozzle for spacing said valve plug from said valve seat when said nozzle coacts with said head, the coacting parts of the nozzle and head comprising a cylinder, packing therein and a leak hole through the wall of said cylinder, said packing being movable into said cylinder as the nozzle coacts with said head and covering said leak hole after the nozzle spaces said valve plug from said seat, and spring means to normally retain said valve plug seated against said seat.

14. In a grease gun head and nozzle construction for use with a grease reservoir having grease under pressure therein, a grease gun head and a direct delivery nozzle coactable therewith, a delivery bore in said head, an inlet valve seat and an outlet valve seat in said bore, said valve seats being spaced from and facing each other, a booster between said reservoir and the space between said valve seats, a valve plug in said bore of less diameter than the bore and of less length than the distance between said seats, means normally constraining said valve plug to engage the outer seat only, said direct delivery nozzle having an extension of less diameter than said bore and engaging said valve plug when the nozzle is associated with said head, said extension being of predetermined length to space said valve plug from the outer seat and position it between the seats whereby grease under pressure from said reservoir can flow direct to said nozzle through said bore past both seats and the valve plug and a second nozzle coactable with said grease gun head when said booster is to be used, said second nozzle having an extension of less diameter than said bore and engageable with said valve plug when said second nozzle is associated with said head, said last mentioned extension being of predetermined length to space said valve plug from the outer valve seat and position it in engagement with the inner one whereby grease under pressure from said reservoir is retained against direct flow past said inner valve seat, said booster is operable to pump grease from said reservoir through the outer valve seat and the second nozzle and means to prevent leakage of grease from the coacting parts of said head and nozzles while connecting either nozzle to the head.

15. In a device of the class described, a grease gun head and a nozzle for coaction therewith, a check valve in said head, said nozzle having an extension to engage said check valve and unseat it when said nozzle coacts with said head, the coacting parts of the nozzle and head comprising a cylinder, a cup leather therein and a plunger to engage said cup leather, said cylinder having a leak hole to relieve compressed air from within said cylinder as coaction takes place.

16. In a device of the class described, a grease gun head and a nozzle for coaction therewith, a check valve in said head, said nozzle having an extension to engage said check valve and unseat it when said nozzle coacts with said head, the coacting parts of the nozzle and head comprising a cylinder, a cup leather therein and a plunger to engage said cup leather, said cylinder having a leak hole to relieve compressed air from within said cylinder as coaction takes place, said leak hole being covered by said cup leather after said extension engages said valve plug.

17. In a device of the class described, a grease gun head and a nozzle for coaction therewith, a check valve in said head, said nozzle having an extension to engage said check valve and unseat it when said nozzle coacts with said head, the coacting parts of the nozzle and head comprising a cylinder, a cup leather therein and a plunger to engage said cup leather, said cylinder having a leak hole to relieve compressed air from within said cylinder as coaction takes place, said head and said nozzle having coacting screw threads for connecting the two together.

IVAN L. EASTMAN.